(12) United States Patent
Brouillette et al.

(10) Patent No.: US 7,993,451 B2
(45) Date of Patent: Aug. 9, 2011

(54) CEMENT STABILIZATION OF SOILS USING A PROPORTIONAL CEMENT SLURRY

(75) Inventors: Fred Brouillette, Colleyville, TX (US); Cliff Ryan, Carrollton, TX (US)

(73) Assignee: Texas Industries, Inc., Dallas, TX (US)

( * ) Notice: Subject to any disclaimer, the term of this patent is extended or adjusted under 35 U.S.C. 154(b) by 820 days.

(21) Appl. No.: 11/837,764

(22) Filed: Aug. 13, 2007

(65) Prior Publication Data

US 2009/0044726 A1 Feb. 19, 2009

(51) Int. Cl.
*C04B 24/10* (2006.01)
*C04B 24/38* (2006.01)

(52) U.S. Cl. ......... 106/729; 106/724; 106/819; 106/823

(58) Field of Classification Search .................. 106/724, 106/730, 819, 823, 729
See application file for complete search history.

(56) References Cited

U.S. PATENT DOCUMENTS

| | | | | |
|---|---|---|---|---|
| 2,427,683 A * | 9/1947 | Ludwig | ......... | 106/720 |
| 2,629,667 A * | 2/1953 | Kaveler | ......... | 106/720 |
| 3,483,007 A | 12/1969 | Hook | | |
| 3,498,809 A | 3/1970 | Andersson | | |
| 4,210,455 A * | 7/1980 | Metcalf et al. | ......... | 106/727 |
| 4,470,463 A * | 9/1984 | Holland | ......... | 166/293 |
| 4,478,640 A * | 10/1984 | Holland | ......... | 106/607 |
| 4,935,060 A * | 6/1990 | Dingsoyr | ......... | 106/719 |
| 5,447,197 A * | 9/1995 | Rae et al. | ......... | 166/293 |
| 5,547,506 A * | 8/1996 | Rae et al. | ......... | 106/730 |
| 6,220,354 B1 * | 4/2001 | Chatterji et al. | ......... | 166/293 |
| 6,500,252 B1 * | 12/2002 | Chatterji et al. | ......... | 106/644 |
| 6,511,537 B1 * | 1/2003 | Barlet-Gouedard et al. | . | 106/727 |
| 6,613,142 B1 * | 9/2003 | D'Almeida et al. | ......... | 106/789 |
| 7,353,870 B2 * | 4/2008 | Roddy et al. | ......... | 166/293 |
| 2009/0011207 A1 * | 1/2009 | Dubey | ......... | 428/219 |
| 2009/0197991 A1 * | 8/2009 | Bury et al. | ......... | 524/2 |

FOREIGN PATENT DOCUMENTS

CA 2110658 6/1994

OTHER PUBLICATIONS

Portland Cement Association Advertising Supplement, "The Road Recycled: Full-Depth Reclamation with Cement"—2006.

* cited by examiner

*Primary Examiner* — Paul Marcantoni
(74) *Attorney, Agent, or Firm* — Locke Lord Bissell & Liddell, LLP (57) ABSTRACT

A novel cement slurry composed of cement and water that can be used in cement stabilization applications. The cement slurry compound itself is chemically treated, by means of a cellulosic or other thixotropic thickening agent(s) to create a thixotropic system wherein the wetted cement remains in suspension and does not settle out prior to use even without further mixing. A chemical retarder/stabilizer is also used to prevent the slurry from prematurely setting during shipping. A novel apparatus and method for mixing the novel cement slurry is disclosed to insure the exact proportioning of all ingredients and the proper wetting of the cement.

86 Claims, 8 Drawing Sheets

CEMENT STABILIZATION OF SOILS USING A PROPORTIONAL CEMENT SLURRY

BACKGROUND OF THE INVENTION

1. Field of Use

The invention relate to the use of cement to stabilize substrate soils and, more particularly, to the use of a novel cement slurry that remains in suspension and does not prematurely set.

2. Related Art

In the construction industry, a stable rigid base is required for paving, building and parking structures, which requires the stabilization of the substrate soil. This stabilization may be accomplished by combining cement with the soil. Combinations of cement and soil are referred to as, but not limited to, soil cement, cement treated base, cement stabilized soil, and cement treated soil. The creation of soil cement involves the addition of specified amounts of cement per cubic unit of soil. The aforementioned soil is then graded and compacted to meet requirements specified in job plans and drawings. The cement treated soils are then allowed to cure, a chemical process whereby the cohesive material gains in strength and rigidity over time.

One method commonly used to create cement treated soil is a dry cement method. This generally involves using a pneumatic pumping apparatus to blow dry cement onto a soil substrate and then mixing the cement into the soil. While commonly used, this process is considered undesirable due to the large amount of dust created by the blowing of fine cement powder. This is especially undesirable for the creation of soil cement in more populated areas.

Another method to create soil cement is to use a cement slurry. A cement slurry is basically powdered cement suspended in water. There are various known methods for creating cement slurry. The cement slurry preparation is placed over a substrate soil and then mixed in using mechanical means. Cement slurries are seen as a more desirable method of cement treatment than that of dry cement methods. However, slurry methods have proven to be very problematic in use. Cement slurry will harden in shipping vehicles if not removed in a timely manner. In addition, the cement itself will separate or fall out of solution almost immediately after mixing with water. Even in concentrations as low as 10% cement in water, the cement will begin to fall out of solution within a couple of minutes. As a result, cement slurries have been effectively limited to 30% cement in water, even when using mechanical mixing. In addition, the excess water required to keep the cement in suspension often raises the moisture level of the substrate soil above the desired range for creation of the soil cement.

The use of chemical retardation to prevent the set of cement based materials, including cement slurry, is well known throughout the industry. One common retarding compound is sugar. Employing chemical retardation in cement slurry tends to diminish the problems of setting prior to application. However, it additionally tends to increase the rate at which the cement falls out of solution.

Methods to overcome the propensity of cement to precipitate inside transportation vehicles include drum mixing and recirculation pumps. Both methods involve mechanical means to keep the solution moving so as to prevent the cement from settling within the shipping vehicle. Should settlement occur, the resulting segregation of the water and cement particles make it impossible to properly regulate the dispersion of the binary solution. This event also creates a great deal of maintenance problems for the vehicle operator. As a result of these limitations and despite the lack of dust creation, the use of cement slurry tends to be rare. The problematic properties of cement slurry have significantly limited its use and made other stabilization methods more desirable. Consequently, there remains a need for a cement slurry that does not prematurely set or settle out during transport.

As an alternative to soil cement, a process called full depth reclamation can be used to provide a base for structures such as roads, parking lots, and other paved areas. This process involves grinding up and pulverizing the asphalt surface and blending it with the underlying base, subbase, and/or subgrade material. Cement and water is added to the combined materials to stabilize it much in the same way that cement can be added to substrate soil to created stabilized soil cement. The mixture is then compacted in place to form a stabilized substrate for the new paving. This process allows deteriorated roadways and other paved surfaces to be rebuilt without requiring lots of additional aggregate raw materials or having to cart away and dispose of the old asphalt and other materials. The process also allows roadways to be repaved and strengthened without changing the level of the grade, thereby avoiding issues where the pavement meets curbs and drain grates as well as avoiding changing the amount of clearance under overpasses on roadways. However, this process, because it involves the addition of cement to stabilize the base, runs into the same problems discussed above with respect to the application of cement for soil stabilization.

While rare, thixotropic and other thickeners have been occasionally used in connection with cement applications, although not in connection with cement slurries. Methylcellulose compounds have been used when pouring concrete underwater. In contrast to thickening the concrete, the methylcellulose is added to minimizes the amount of concrete that is washed away by the surrounding water. This reduces the requirement that the structures be over engineered to account for the amount of sacrificial concrete that is washed away. Starch or other thickeners such as silica have been used in specific cement applications such as shotcrete, where dry or mixed concrete is spayed onto walls and/or ceilings, and in thin set mortar. However, in these applications, the thickener is added to a mixture that is already very low in water content and viscosity, for purposes of increased self-adhesion, and does not lower the viscosity of a fluid, reduce the tendency for disaggregation or settling out of suspended elements in a fluid, or increase the time before the mixture sets.

SUMMARY OF THE INVENTION

A first aspect of the invention is a novel cement slurry for use in soil cement and other cement applications. The slurry is generally composed of cement and water. The cement slurry compound itself is chemically treated, by means of a cellulosic or other thixotropic thickening agent to create a thixotropic system wherein for a given amount of time the wetted cement remains in suspension and does not settle out. Further, a chemical retarder/stabilizer such as sugar or other known chemical retarders is added to prevent the slurry from setting during shipping. The novel cement slurry is stable in composition and will not set during shipping in a tanker or distributor trucks until placed on the soil where cement treatment, stabilization or conditioning is to occur. The stable thixotropic slurry compound does not require further mixing while in transit in order to keep the wetted cement in suspension. The proportion of cement, water, and admixtures is adjustable to the needs and requirements of various jobs. Slurries of much higher proportions of cement that are fluid and stable than those of other methods can be achieved.

In another aspect of the invention, a novel apparatus and method for mixing the novel cement slurry is disclosed to insure the exact proportioning of all ingredients and the proper wetting of the cement. Through novel mechanical means the apparatus thoroughly wets and mixes specific weighted proportions of cement, water, thickening agent(s), retarder(s) and defoamer/anti-foamer(s). A mixing tank is filled with the amount of water required for the size and cement ratio for a particular batch. Cement is then injected into the mixing tank, such as by using a pneumatically pressurized pump, below the surface of the water in the tank. The water/slurry in the mixing tank is also circulated and is injected back into the mixing tank in close proximity to the cement injection point. Both the cement and recirculated streams are focused on a screen diffuser located within the mixing chamber. The cement is wetted and broken up by the force created by the two streams colliding with the screen diffuser and recirculation through the main pump. The admixtures can be added during this time or following the addition of cement. Cement compatible defoamer/anti-foamer can be added throughout the process to control the formation of excessive foam or excessive air entrainment within the slurry.

BRIEF DESCRIPTION OF DRAWINGS

The apparatus of the invention is further described and explained in relation to the following figures, wherein.

DETAILED DESCRIPTION OF THE PREFERRED EMBODIMENTS

The cement slurry, method of manufacturing the cement slurry, and the apparatus used to manufacture the cement slurry may be better understood by the following discussion of various embodiments of the disclosed invention.

In a preferred embodiment, the novel cement slurry is composed of cement, water, chemical retardant/stabilizer, a cellulosic, and antifoaming/defoaming agent. The various components are mixed together sufficiently to create a homogeneous mixture wherein the cement is completely wetted and in suspension in the water without clumping or settling.

It is currently preferred that the cement slurry contain from about 60 to about 65 weight percent cement and from about 40 to about 35 weight percent water. The cement used herein includes all Portland cement types, fly ash (all types), slag cements, ABD (alkaline bypass dust), CKD (cement kiln dust), and other pozzolanic materials as well as mixtures of one or more of the above compounds. Higher concentrations of cement are not preferred because they begin to render the slurry too stiff to use while lower concentrations render the slurry too fluid and difficult to control.

A thixotropic thickening agent(s), preferably a cellulosic or another agent that contains cellulose or a cellulose derivative, is used in the slurry in an amount that is proportionate to the amount of cement that is being used. The cellulosic or thickening agent is used to create a thixotropic system wherein a given amount of time the wetted cement remains in suspension and does not settle out. The thixotropic thickener is a water retention agent that gels and increases the viscosity of the cement slurry. Thixotropic thickeners that can be useful in the current invention include cellulosic compounds such as methylhydroxyethyl cellulose, other cellulose-containing thickeners, as well as noncellulose thixotropic thickeners including starches, gums, agar-agar, alginate, guar flour, vinyl polymers, polyether, polyamides, polysilicic acid, clay, minerals, silica, and zeolite.

While any thixotropic thickener can be used to suspend the cement particles in the slurry, cellulosic or other cellulose-containing thixotropic thickeners are especially preferred. Cellulose-containing thixotropic thickeners include PAMs, which contain a modified version of cellulose, gorgum, which is a sugar based derivative of cellulose, cellulose ethers, and derivatives of cellulosic materials. Most thixotropic thickeners that are available for use in cement applications are understood to either be a cellulostic or contain cellulose or a derivative thereof and therefore are considered cellulose-containing thixotropic thickeners. Without being bound to any theory, cellulose-containing thixotropic thickeners are believed to encapsulate the cement particles as well as retain water in a gel. This prevents the cement from prematurely reacting with the water, which would result in the cement starting to set. Cellulose-containing thixotropic thickeners are also believed to advantageously release the retained water after a desired period of time, which allows the water to reach the cement particles after the slurry is applied to the substrate in order to form the cement stabilized composition.

Because it fully encapsulates the cement, cellulose-containing thixotropic thickeners do not require as much sugar or other retarder as other thixotropic thickeners. This can be important because sugar reduces the surface friction of water, thereby requiring additional thixotropic thickeners to thicken the slurry to keep the cement in suspension. The necessary additional amounts of thixotropic thickener may require the use of even more retarder, thereby exacerbating the situation. As such, it is currently believed that better results can be achieved using cellulose-containing thixotropic thickeners.

The cellulosic is preferably surface treated. The surface treatment maintains the cellulosic as individual particles until the surface treatment wears away. The surface treatment will degrade due to mechanical abrasion as well as pH that is above 8. Cement has a pH of about 12-14, so the surface treatment begins to break down as soon as it contacts the cement slurry. As the surface treatment breaks down, the cellulosic reacts with the water that is present and raises the viscosity of the cement slurry. The same property of the cellulosic that raises the viscosity of the slurry is believed to help the cement remain suspended in the water by gelling to form a thioxotropic solution. If the cellulosic does not contain a surface treatment, it will generally not properly disperse but instead will form clumps of gel that have a powder center. The vast majority of cellulosic products that are commercially available are already surface treated.

Cellulosic compounds useful in the current invention include methylhydroxyethyl cellulose, cellulose ethers, and derivatives of cellulosic compounds. A preferred cellulosic is Walocel MW 25,000-45,000 PFV methylhydroxyethyl cellulose, manufactured by Wolff Cellulosics, a division of Bayer located in Germany.

The amount of cellulosic that is used is directly proportional to the proportion of cement that is present in the slurry. The preferred cement slurry contains from about 0.1 to about 0.25 weight percent cellulosic based upon the weight of cement. Lower amounts of cellulosic produces slurries that are too fluid and are more difficult to control (like water) while higher levels tend to gel and are not considered to be economically viable. However, in some cases it is desirable to use higher amounts of cellulosic. For example, if the slurry is going to be applied on a steep grade it may be desirable to have a more viscous slurry so that it does not flow off the steep grade before it is mechanically mixed into the soil. This can be achieved by using more cellulosic without affecting the amount of working time available before the slurry begins to set.

The use of a cellulosic in connection with the equipment used to manufacture commercial batches of cement slurry result in the foaming of the cement slurry. The foaming necessitates the addition of an antifoaming/defoaming agent to the cement slurry. In contrast, laboratory scale batches of cement slurry do not require any defoamer. The defoamer should be inert to and not react with cement or any of the other additives that are present in the slurry. Useful defoamer/anti-foamer compounds include: Munzing Chemicals Agitan P-823, tributyl phosphate, Dee Fo 97-3, or other cement compatible defoamers. Selection of the antifoaming/defoaming agent must be made carefully, as some agents, while solving the foaming issue, will create other problems with the cement slurry. The antifoaming/defoaming agent preferably does not have any chemical interaction with the cement or the cellulosic compound and has no effect on the slurry other than to prevent and/or reduce the generation of foam. One currently preferred antifoaming/defoaming agent is Agitan P-823, manufactured by Ultra Additives/Munzing Chemicals, which is located in Bloomfield, N.J.

It is currently preferred that the cement slurry contain from about 0.006 to about 0.02 weight percent defoamer. Lower amounts are not usually effective at sufficiently controlling foaming and higher amounts are not usually necessary and thus are not economically viable. However, the amount of defoamer required will change based upon factors such as the properties of the water that is being used, the ambient temperature, the equipment used to mix the slurry, as well as the particular type and amount of cellulosic that is used. As a result, the amount of defoamer required will vary and have to be adjusted from batch to batch of slurry.

In some cases, it may not be necessary to add any defoamer at all to the cement slurry. This is true when making small laboratory scale batches of slurry. Foaming becomes a more significant problem as a result of the equipment used to inject and mix the cement with the water in larger commercial scale quantities. In particular, the use of a pneumatic pump to add the cement also results in the simultaneous addition of air to the water, resulting in foaming. The use of other types of equipment may result in more or less foaming and thus affects the amount of antifoamer/defoamer required. One of skill would be able to determine the appropriate amount of antifoamer/defoamer required in connection with particular equipment.

The chemical retardant/stabilizer is used to prevent the cement from prematurely setting during transport or otherwise before the cement slurry is mixed into the substrate soil. Various materials that can be used as a chemical retardant/stabilizer include but are not limited to: sucrose, "Recover" produced by Grace Chemicals located at Columbia, Md., lignosulfonates, carboxylic acids, polycarboxylic acids, whey protein, carbohydrates, oxides of lead and zinc, phosphates, magnesium salts, fluorates, and borates, ASTM C494, Type D such as Pozzolith 300-R, supplied by Master Builders BASF Admixtures of Houston, Tex., and Plastiment, supplied by Sika Corp, of Lyndhurst, N.J.

The use of a chemical retardant/stabilizer prevents drastic changes in the fluid viscosity (e.g. setting) of the cement slurry which would render the slurry unusable. One currently preferred retardant/stabilizer used is sucrose in amounts of from about 0.05 to about 0.1 weight percent based upon the weight of cement in the slurry. This is based upon the arbitrary desire for the slurry to remain workable for at least 8 hours, which corresponds to a full work shift. Lower amounts are not preferred because they cannot retard the cement sufficiently to guarantee 8 hours of workability and higher levels may retard too much or may create difficulty in the suspension properties of the cellulosic. The preferred amount of retardant/stabilizer used will generally retard the cement slurry from setting for a period of time from about 10 to about 17 hours, but is sufficient to ensure at least 8 hours before the cement sets.

The amounts of components used in the various embodiments varies based upon the requirements for the particular job. For example, different amounts of cement may be required per unit of substrate soil to produce soil cement having the desired properties. Based upon this and other parameters, such as how much slurry is going to be mixed in per unit of soil and the moisture requirements for the soil cement, one of skill can determine the relative percentage of cement and water required in the cement slurry.

The components also have an interrelated effect on the properties of the overall slurry. As a result, as the proportion of one ingredient is varied, the amounts of other ingredients must also be correspondingly adjusted. Specifically, as one increases the weight percent of cement in the slurry, the amount of cellulosic can be slightly decreased as there is less water to be tied up. At the same time more sugar is required to be able to retard the increased amount of cement. The amount of the defoamer will also need to be adjusted as the foaming behavior changes. In contrast, as you decrease the weight percent of cement in the slurry, more cellulosic is required to tie up the additional water that is in the slurry, the sugar can be slightly decreased since there is less cement to retard, and the amount of defoamer is adjusted as the foaming behavior changes.

Various embodiments of the current invention may be better understood by reference to the following examples.

Example 1

In a laboratory setting, slurry samples A-D were created by combining water, 1000-2500 grams of Portland cement, the specified cellulosic, and sucrose. For samples A-D, the Portland cement formed 45% by weight of the water cement mixture. Sucrose and cellulosic were also added in amounts measured relative to the weight of the cement that was used. Sucrose was added to the mixture to create 0.05 weight percent sucrose by weight of the cement. The amount of sucrose was determined in prior studies as the preferred amount to ensure the slurry remained workable for at least 8 hours.

The sugar and cellulosic were added to the water in a plastic bucket followed by the addition of the cement. The slurry was mixed in the plastic bucket using a Hamilton Beach Scovill "milk-shaker" mixer, which is commonly used in the preparation of plasticity index samples. The slurry batch was mixed for five minutes on the medium setting and the allowed to rest for ten minutes before the initial reading. The initial viscosity was measured using a Fann viscometer at various rotations per minute and the result was corrected for the spring value of the particular Fann viscometer that was used. The viscosity is reported in centipose (Cp). Further viscosity measurements were taken over a period of hours following the formation of the slurry. The slurry was not further mixed following its initial preparation other than for a 10 second interval prior to each measurement in order to breakup the gel formation and return the slurry to a fluid state in order for it to be tested in the Fann Viscometer.

Sample A served as a control and did not contain any cellulosic. For Sample B, 0.10 weight percent by weight of the cement of the cellulosic Walocel methylcellulose 400 PFV ("MK 400") was added. Walocel methylcellulose 400 PFV is a cellulosic manufactured by Wolff Cellulosics, a division of Bayer located in Germany. For Sample C, 0.15 weight percent of MK 400 was added. For Sample D, 0.20 weight percent of MK 400 was added. The results are shown below in Table 1.

TABLE 1

| Sample | % BWOC Admix | Age | 600 RPM | 300 RPM | 6 RPM | 3 RPM | 200 RPM | 100 RPM | SI Plastic viscosity | Yield Point | CP Plastic viscosity | Yield Point |
|---|---|---|---|---|---|---|---|---|---|---|---|---|
| A | control | 0:00 | 20 | 10 | 5 | 0 | 8 | 5 | 0.02 | 0 | 10 | 0 |
|   | control | 2:46 | 20 | 10 | 0 | 0 | 8 | 5 | 0.02 | 0 | 10 | 0 |
|   | control | 4:45 | 20 | 13 | 5 | 5 | 10 | 5 | 0.01 | 5 | 8 | 5 |
|   | control | 6:40 | 25 | 15 | 5 | 5 | 13 | 10 | 0.02 | 5 | 10 | 5 |
|   | control | 8:40 | 40 | 25 | 5 | 5 | 20 | 15 | 0.03 | 10 | 15 | 10 |
|   | control | 8:41 | 30 | 20 | 5 | 5 | 15 | 10 | 0.02 | 10 | 10 | 10 |
| B | 0.10% | 0:00 | 33 | 23 | 5 | 5 | 20 | 13 | 0.02 | 12.5 | 10 | 13 |
|   | 0.10% | 6:41 | 50 | 30 | 5 | 5 | 20 | 13 | 0.04 | 10 | 20 | 10 |
|   | 0.10% | 8:42 | 70 | 40 | 5 | 5 | 30 | 20 | 0.06 | 10 | 30 | 10 |
|   | 0.10% | 2:49 | 45 | 25 | 5 | 5 | 20 | 10 | 0.04 | 5 | 20 | 5 |
|   | 0.10% | 4:48 | 45 | 25 | 5 | 5 | 20 | 13 | 0.04 | 5 | 20 | 5 |
|   | 0.10% | 8:45 | 55 | 35 | 5 | 5 | 25 | 20 | 0.04 | 15 | 20 | 15 |
| C | 0.15% | 0:00 | 40 | 23 | 5 | 5 | 20 | 13 | 0.03 | 5 | 18 | 5 |
|   | 0.15% | 6:37 | 55 | 35 | 5 | 5 | 30 | 20 | 0.04 | 15 | 20 | 15 |
|   | 0.15% | 2:45 | 50 | 30 | 5 | 5 | 25 | 15 | 0.04 | 10 | 20 | 10 |
|   | 0.15% | 8:40 | 115 | 75 | 15 | 10 | 50 | 35 | 0.08 | 35 | 40 | 35 |
|   | 0.15% | 4:45 | 55 | 30 | 10 | 5 | 25 | 20 | 0.05 | 5 | 25 | 5 |
|   | 0.15% | 8:45 | 55 | 35 | 10 | 5 | 25 | 20 | 0.04 | 15 | 20 | 15 |
| D | 0.20% | 0:00 | 45 | 35 | 5 | 5 | 30 | 15 | 0.02 | 25 | 10 | 25 |
|   | 0.20% | 6:30 | 55 | 35 | 10 | 5 | 30 | 25 | 0.04 | 15 | 20 | 15 |
|   | 0.20% | 2:42 | 55 | 30 | 5 | 5 | 25 | 20 | 0.05 | 5 | 25 | 5 |
|   | 0.20% | 4:41 | 55 | 35 | 10 | 5 | 30 | 20 | 0.04 | 15 | 20 | 15 |
|   | 0.20% | 8:39 | 80 | 55 | 5 | 10 | 40 | 30 | 0.05 | 30 | 25 | 30 |
|   | 0.20% | 8:43 | 55 | 35 | 5 | 5 | 25 | 20 | 0.04 | 15 | 20 | 15 |

Example 2

Batches of slurry were created using the procedure identified in Example 1, except that the weight percent of Portland cement in the slurry was increased to 65%. Sample E, was a control that did not contain any cellulosic. Sample F contained 0.10 weight percent cellulosic MK 400 by weight of the cement. Sample G contained 0.15 weight percent cellulosic MK 400 by weight of the cement. Sample H contained 0.20 weight percent cellulosic MK 400 by weight of the cement. The results are shown below in Table 2.

Example 3

Batches of slurry were created using the procedure identified in Example 1, except that the weight percent of Portland cement in the slurry was increased to 67.5%. Sample I, was a control that did not contain any cellulosic. Sample J contained 0.10 weight percent cellulosic MK 400 by weight of the cement. Sample K contained 0.15 weight percent cellulosic MK 400 by weight of the cement. Sample L contained 0.20 weight percent cellulosic MK 400 by weight of the cement. The results are shown below in Table 3.

TABLE 2

| Sample | % BWOC Admix | Age | 600 RPM | 300 RPM | 6 RPM | 3 RPM | 200 RPM | 100 RPM | SI Plastic viscosity | Yield Point | CP Plastic viscosity | Yield Point |
|---|---|---|---|---|---|---|---|---|---|---|---|---|
| E | control | 0:42 | 85 | 55 | 20 | 15 | 45 | 35 | 0.06 | 25 | 30 | 25 |
|   | control | 4:21 | 145 | 100 | 30 | 25 | 90 | 70 | 0.09 | 55 | 45 | 55 |
|   | control | 7:09 | — | 75 | 25 | 20 | 60 | 45 | — | — | — | — |
| F | 0.10% | 0:45 | 120 | 80 | 25 | 20 | 60 | 45 | 0.08 | 40 | 40 | 40 |
|   | 0.10% | 4:26 | 175 | 125 | 35 | 30 | 100 | 75 | 0.10 | 75 | 50 | 75 |
|   | 0.10% | 7:08 | — | 75 | 25 | 20 | 60 | 45 | — | — | — | — |
| G | 0.15% | 0:48 | 140 | 85 | 25 | 20 | 70 | 50 | 0.11 | 30 | 55 | 30 |
|   | 0.15% | 4:30 | 235 | 160 | 50 | 40 | 130 | 95 | 0.15 | 85 | 75 | 85 |
|   | 0.15% | 8:07 | — | 75 | 25 | 0 | 60 | 45 | — | — | — | — |
| H | 0.20% | 0:52 | 185 | 115 | 30 | 25 | 85 | 60 | 0.14 | 45 | 70 | 45 |
|   | 0.20% | 4:34 | 215 | 140 | 45 | 40 | 115 | 80 | 0.15 | 65 | 75 | 65 |
|   | 0.20% | 8:34 | 695 | 550 | 160 | 135 | 485 | 415 | 0.28 | 405 | 145 | 405 |

TABLE 3

| Sample | % BWOC Admix | Age | 600 RPM | 300 RPM | 6 RPM | 3 RPM | 200 RPM | 100 RPM | SI Plastic viscosity | SI Yield Point | CP Plastic viscosity | CP Yield Point |
|---|---|---|---|---|---|---|---|---|---|---|---|---|
| I | control | 0:54 | 120 | 80 | 25 | 20 | 65 | 50 | 0.08 | 40 | 40 | 40 |
|   | control | 4:40 | 260 | 190 | 55 | 40 | 160 | 130 | 0.14 | 120 | 70 | 120 |
|   | control | 7:05 | — | 75 | 25 | 0 | 60 | 45 | — | — | — | — |
| J | 0.10% | 0:53 | 190 | 120 | 30 | 25 | 90 | 65 | 0.14 | 50 | 70 | 50 |
|   | 0.10% | 4:44 | 325 | 225 | 55 | 45 | 180 | 135 | 0.20 | 125 | 100 | 125 |
|   | 0.10% | 6:58 | — | 75 | 25 | 0 | 60 | 45 | — | — | — | — |
| K | 0.15% | 0:58 | 240 | 145 | 35 | 30 | 115 | 75 | 0.19 | 50 | 95 | 50 |
|   | 0.15% | 4:47 | 325 | 220 | 65 | 55 | 180 | 135 | 0.21 | 115 | 105 | 115 |
|   | 0.15% | 6:57 | — | 75 | 25 | 0 | 60 | 45 | — | — | — | — |
| L | 0.20% | 1:03 | 295 | 180 | 45 | 40 | 140 | 95 | 0.23 | 65 | 115 | 65 |
|   | 0.20% | 4:56 | 400 | 265 | 80 | 65 | 220 | 165 | 0.26 | 130 | 135 | 130 |
|   | 0.20% | 6:56 | — | 75 | 25 | 0 | 60 | 45 | — | — | — | — |

Example 4

Batches of slurry were created using the procedure identified in Example 1 using 45% weight percent of Portland cement. Sample M contained 0.10 weight percent of the Walocel methylcellulose MK 40,000 PFV cellulosic manufactured by Wolff Cellulosics, a division of Bayer in Germany ("MK 40,000") by weight of the cement. Sample N contained 0.15 weight percent cellulosic MK 40,000 by weight of the cement. Sample O contained 0.20 weight percent cellulosic MK 40,000 by weight of the cement. The results are shown below in Table 4.

Example 5

Batches of slurry were created using the procedure identified in Example 1 using 65% weight percent of Portland cement. Sample P contained 0.10 weight percent cellulosic MK 40,000 by weight of the cement. Sample Q contained 0.15 weight percent cellulosic MK 40,000 by weight of the cement. Sample R contained 0.20 weight percent cellulosic MK 40,000 by weight of the cement. The results are shown below in Table 5.

TABLE 4

| Sample | % BWOC Admix | Age | 600 RPM | 300 RPM | 6 RPM | 3 RPM | 200 RPM | 100 RPM | SI Plastic viscosity | SI Yield Point | CP Plastic viscosity | CP Yield Point |
|---|---|---|---|---|---|---|---|---|---|---|---|---|
| M | 0.10% | 0:31 | 30 | 15 | 0 | 0 | 10 | 5 | 0.03 | 0 | 15 | 0 |
|   | 0.10% | 1:56 | 25 | 15 | 0 | 0 | 10 | 5 | 0.02 | 5 | 10 | 5 |
|   | 0.10% | 3:49 | 35 | 15 | 0 | 0 | 15 | 10 | 0.04 | −5 | 20 | −5 |
|   | 0.10% | 5:51 | 35 | 15 | 5 | 5 | 15 | 10 | 0.04 | −5 | 20 | −5 |
|   | 0.10% | 7:50 | 40 | 20 | 5 | 5 | 15 | 10 | 0.04 | 0 | 20 | 0 |
| N | 0.15% | 0:33 | 50 | 30 | 0 | 0 | 20 | 10 | 0.04 | 10 | 20 | 10 |
|   | 0.15% | 1:58 | 40 | 25 | 0 | 0 | 20 | 10 | 0.03 | 10 | 15 | 10 |
|   | 0.15% | 3:52 | 30 | 20 | 0 | 0 | 15 | 10 | 0.02 | 10 | 10 | 10 |
|   | 0.15% | 5:53 | 35 | 20 | 0 | 0 | 10 | 5 | 0.03 | 5 | 15 | 5 |
|   | 0.15% | 7:51 | 35 | 20 | 0 | 0 | 15 | 10 | 0.03 | 5 | 15 | 5 |
| O | 0.20% | 0:37 | 65 | 35 | 0 | 0 | 25 | 15 | 0.06 | 5 | 30 | 5 |
|   | 0.20% | 2:01 | 60 | 30 | 0 | 0 | 25 | 15 | 0.06 | 0 | 30 | 0 |
|   | 0.20% | 3:53 | 60 | 30 | 0 | 0 | 20 | 15 | 0.06 | 0 | 30 | 0 |
|   | 0.20% | 5:56 | 35 | 20 | 0 | 0 | 15 | 10 | 0.03 | 5 | 15 | 5 |
|   | 0.20% | 7:53 | 35 | 20 | 0 | 0 | 10 | 5 | 0.03 | 5 | 15 | 5 |

TABLE 5

| Sample | % BWOC Admix | Age | 600 RPM | 300 RPM | 6 RPM | 3 RPM | 200 RPM | 100 RPM | SI Plastic viscosity | SI Yield Point | CP Plastic viscosity | CP Yield Point |
|---|---|---|---|---|---|---|---|---|---|---|---|---|
| P | 0.10% | 2:08 | 30 | 15 | 0 | 0 | 10 | 5 | 0.03 | 0 | 15 | 0 |
|   | 0.10% | 4:40 | 25 | 15 | 0 | 0 | 10 | 5 | 0.02 | 5 | 10 | 5 |
|   | 0.10% | 6:30 | 35 | 15 | 0 | 0 | 15 | 10 | 0.04 | −5 | 20 | −5 |
|   | 0.10% | 7:45 | 35 | 15 | 5 | 5 | 15 | 10 | 0.04 | −5 | 20 | −5 |
| Q | 0.15% | 2:10 | 50 | 30 | 0 | 0 | 20 | 10 | 0.04 | 10 | 20 | 10 |
|   | 0.15% | 4:58 | 40 | 25 | 0 | 0 | 20 | 10 | 0.03 | 10 | 15 | 10 |
|   | 0.15% | 6:35 | 30 | 20 | 0 | 0 | 15 | 10 | 0.02 | 10 | 10 | 10 |
|   | 0.15% | 7:48 | 35 | 20 | 0 | 0 | 10 | 5 | 0.03 | 5 | 15 | 5 |
| R | 0.20% | 2:16 | 65 | 35 | 0 | 0 | 25 | 15 | 0.06 | 5 | 30 | 5 |
|   | 0.20% | 5:04 | 60 | 30 | 0 | 0 | 25 | 15 | 0.06 | 0 | 30 | 0 |
|   | 0.20% | 6:40 | 60 | 30 | 0 | 0 | 20 | 15 | 0.06 | 0 | 30 | 0 |
|   | 0.20% | 7:53 | 35 | 20 | 0 | 0 | 15 | 10 | 0.03 | 5 | 15 | 5 |

Example 6

Batches of slurry were created using the procedure identified in Example 1 using 67.5% weight percent of Portland cement. Sample S contained 0.10 weight percent cellulosic MK 40,000 by weight of the cement. Sample T contained 0.15 weight percent cellulosic MK 40,000 by weight of the cement. Sample U contained 0.20 weight percent cellulosic MK 40,000 by weight of the cement. The results are shown below in Table 6.

TABLE 6

| Sample | % BWOC Admix | Age | 600 RPM | 300 RPM | 6 RPM | 3 RPM | 200 RPM | 100 RPM | SI Plastic viscosity | SI Yield Point | CP Plastic viscosity | CP Yield Point |
|---|---|---|---|---|---|---|---|---|---|---|---|---|
| S | 0.10% | 2:21 | 55 | 30 | 5 | 5 | 20 | 15 | 0.05 | 5 | 25 | 5 |
|   | 0.10% | 5:08 | 50 | 30 | 5 | 5 | 20 | 15 | 0.04 | 10 | 20 | 10 |
|   | 0.10% | 6:48 | 50 | 25 | 5 | 5 | 20 | 15 | 0.05 | 0 | 25 | 0 |
|   | 0.10% | 8:05 | — | 30 | 5 | 5 | 25 | 20 | — | — | — | — |
| T | 0.15% | 2:27 | 85 | 50 | 5 | 5 | 35 | 20 | 0.07 | 15 | 35 | 15 |
|   | 0.15% | 5:12 | 80 | 40 | 5 | 5 | 30 | 20 | 0.08 | 0 | 40 | 0 |
|   | 0.15% | 6:56 | 65 | 35 | 5 | 5 | 25 | 20 | 0.06 | 5 | 30 | 5 |
|   | 0.15% | 8:03 | 55 | 35 | 5 | 5 | 25 | 20 | 0.04 | 15 | 20 | 15 |
| U | 0.20% | 2:31 | 110 | 60 | 5 | 5 | 45 | 25 | 0.10 | 10 | 50 | 10 |
|   | 0.20% | 5:16 | 80 | 45 | 5 | 5 | 35 | 20 | 0.07 | 10 | 35 | 10 |
|   | 0.20% | 7:00 | 55 | 30 | 5 | 5 | 25 | 15 | 0.05 | 5 | 25 | 5 |
|   | 0.20% | 7:53 | 85 | 50 | 5 | 5 | 35 | 25 | 0.07 | 15 | 35 | 15 |

Based upon the above examples, it can be concluded that the slurries containing up to 65% cement could be kept in a pumpable state for at least 8 hours with the cement remaining in suspension in the slurry. Slurries containing 67.5% cement and higher were found to rapidly become too thick to flow and thus were not considered practical. This conclusion was based upon the increase in the viscosity or thickness of the slurry over time. If the test batch thickened substantially to the point of critical loss of pumpability, it would not be considered acceptable. Subsequent field tests confirmed that the slurry could be trucked safely and delivered without the use of a recirculating pump on the delivery truck.

The viscosity of the slurry composition is directly measured in the above examples using a Fann viscometer. However, it is significantly less practical to directly measure the viscosity of the cement slurry out in the field where it is being produced. Consequently, it is preferred to determine if the cement slurry is completely homogenized by using the API flow cone test. The slurry should have a consistent look and should not have any visible bleed water. Preferably it should take 32 ounces of the slurry from about 50 seconds to about 2 minutes to pass through the API flow cone after it has been initially prepared.

While the flow time though the API flow cone is a useful measurement, there is not a direct correlation between the flow time and the viscosity of the fluid slurry. This is because the API flow cone does not directly measure the viscosity of a fluid but rather only provides indirect evidence of the fluid's viscosity. The flow cone measurement is also affected by things such as the texture of the fluid slurry.

In addition to being used to determine if the slurry is properly homogenized, the flow cone test can be used to measure whether the slurry has begun to set to the point that its ability to be used as a slurry is negatively affected. When using the flow cone test in this manner it is necessary to impart a shear force on the cement sample in order to ensure that the test is measuring the setting of the cement and not the gel state of the slurry. It is inappropriate to use the standard setting times for cement because by the time the cement begins to harden, it is well past the point where it can be successfully used in a slurry composition. In general, if after a period of time the flow time of the slurry is about 30 seconds longer than it was when it was first prepared, the slurry is beginning to set and is no longer useful as a cement slurry.

The above examples 1-6 were carried out in a laboratory setting. As a result, the cement was not introduced using a pneumatic pump and other mechanical equipment used in connection with the manufacture of commercial sized batches of the novel cement slurry. The mechanical action of the equipment used to ensure that larger batches of the slurry is homogenous will also degrade the cellulosic. Consequently, slightly more cellulosic is required during commercial production to achieve the same viscosities identified above in laboratory batches. For example, while the cellulosic is required in an amount of about 0.10 weight percent by weight of cement to achieve a flow time of 1 minute 30 seconds through the API flow cone, in a production environment it will take about 0.15 weight percent by weight of cement of the cellulosic to achieve the same flow time. Therefore the preferred range of cellulosic in the laboratory is from about 0.1 to 0.2 weight percent by weight of cement, which loosely corresponds to from about 0.15 weight percent to 0.25 weight percent by weight of cement when used in larger batches with a mechanical recirculation pump. In addition, because the laboratory samples were small enough that they could be completely mixed without the use of the equipment required for commercial sized batches, no defoamer was required or used.

A preferred apparatus that can be used to manufacture the novel cement slurry is illustrated in FIGS. 1-8. The mixing station 20 is generally composed of a mixing tank 22, recirculating pump 24, cement pneumatic pump 26, additive batcher 28, blending tank 30, and electronic controls 34. Mixing station 20 can be a fixed location plant whereby the various components are constructed in a manner to remain stationary. However, as evidenced in FIGS. 1-8, mixing station 20 can also have a mobile plant configuration on trailer 36. The various components of mixing station 20 would be located on a self-contained trailer apparatus 36 to allow mixing station 20 to be moved over roads and to establish the mixing plant 20 at remote sites for the production of the aforementioned slurry mixture.

Figure 8:
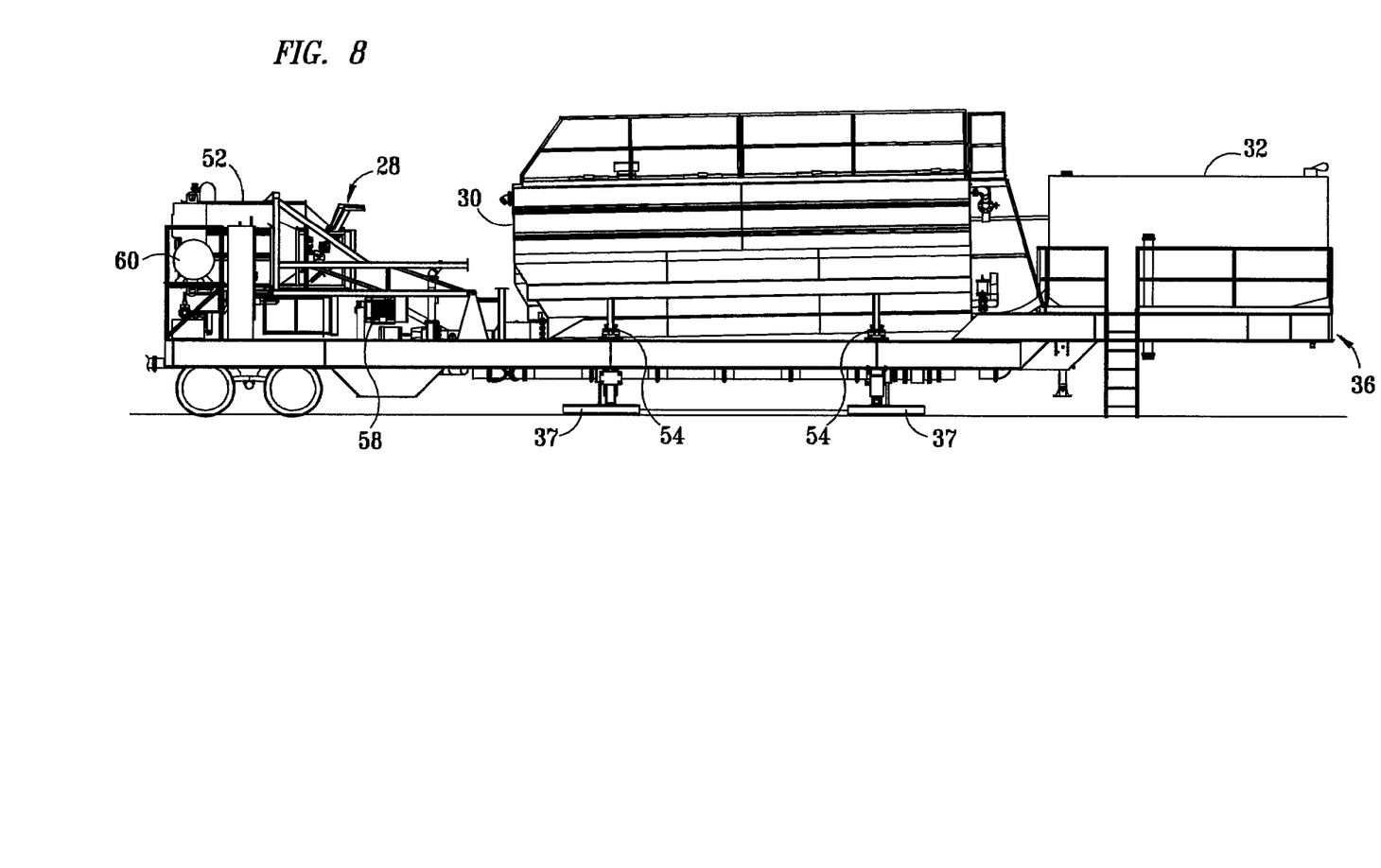
FIG. 8 is a side elevation view of the apparatus of FIG. 1 where the platform containing the additive batcher and dust collector has been placed in the lowered position.

When mixing station 20 is in its mobile plant configuration it will further contain a mobile generator 32 or power source assembly for the supply of electricity in remote locations. The trailer 36 and frame assembly would contain the structural and functional mechanisms for the unified structure of the plant and the maintenance of said structure during road movement. Hydraulic braces 37 can be used to stabilize mixing station 20 when it is not being transported. To the extent that portions of mixing station 20 would extend too high above the ground to allow trailer 36 containing mixing station 20 to travel on highways that contain overpasses, portions of mixing station 20, such as the additive batcher 28, can be stored in a lowered position and hydraulics 50 can be used to raise the portions of mixing station 20 to their operating configuration once mixing station 20 has arrived at the desired location. FIG. 8 shows mixing station 20 with additive batcher 28 and dust collector 54 in the lowered position to minimize the overall height of mixing station 20 above the road. In this manner, mixing station 20 is mobile and can be relocated to the job site where the cement slurry is to be used. Alternately, trailer 36 allows mixing station to be transported between various cities or other locations, allowing a single mixing station 20 to service a broader geographic region.

The preferred method of creating the cement slurry using mixing station 20 begins by pumping or otherwise transferring water to mixing tank 22. The amount of water is determined by the apparatus operator based upon the particular fixed cement water proportion required for the particular job as well as the size of the batch. As discussed above, the preferred cement slurry contains from about 60 to about 65 weight percent cement. Preferably a portion, such as 25%, of the total amount of water required for the particular batch of slurry is pumped into blending tank 30 instead of mixing tank 22. Load cells 46 are provided between mixing tank 22 and trailer 36 and can provide a way of determining when the appropriate amount of water has been added to mixing tank 22. Similarly, load cells 54 are provided between blending tank 30 and trailer 36 to provide a way of determining when the appropriate amount of water has been added to blending tank 30.

While it is possible to add the cellusoic, sugar, and anti-foaming agent directly to the water in mixing tank 22, it is preferred that at least the cellulosic is separately added to a portion of water in blending tank 30. The addition of cement into mixing tank 22 causes aeration and bubbling in the water that is present in mixing tank 22, especially when cement is injected through cement injector line 26 using a pneumatic pump. This action can cause foaming of the cement slurry composition. The presence of a cellulosic in the developing slurry greatly increases the amount of air that gets entrained in the slurry as it creates microstabilized air pockets in the slurry. As a result, more anti-foaming agent is required to prevent foaming of the slurry when the cellulosic is present. Premixing the cellulosic with a portion of the water that is withheld from mixing tank 22 reduces the amount of defoamer that is required because the cellulosic is not present during the cement injection or a portion of the circulation.

In addition, recirculation pump 58 will degrade the cellulosic as it recirculates the water and cement mixture to form a homogenous slurry. The broken down cellulosic is less effective at maintaining the cement in suspension, resulting in an increased amount of cellulosic that is required. As a result, it is preferable to decrease the amount of time the cellulosic is being recirculated through recirculation pump 58. By pre-mixing the cellulosic with a portion of the water in blending tank 30 and adding the solution to mixing tank 22 only after the cement and water have been mixed together, the amount of cellulosic required is kept to a minimum.

The cellulosic is contained in additive batcher 28. Additive batcher 28 adds the desired amount of cellulosic additive to blending tank 30 that contains a portion of the water required for the particular slurry batch. Preferably additive batcher 28 has a vibratory feeder that uses a vibrating tray to sift the desired amount of methylcellulose additive to blending tank 30.

Figure 1:
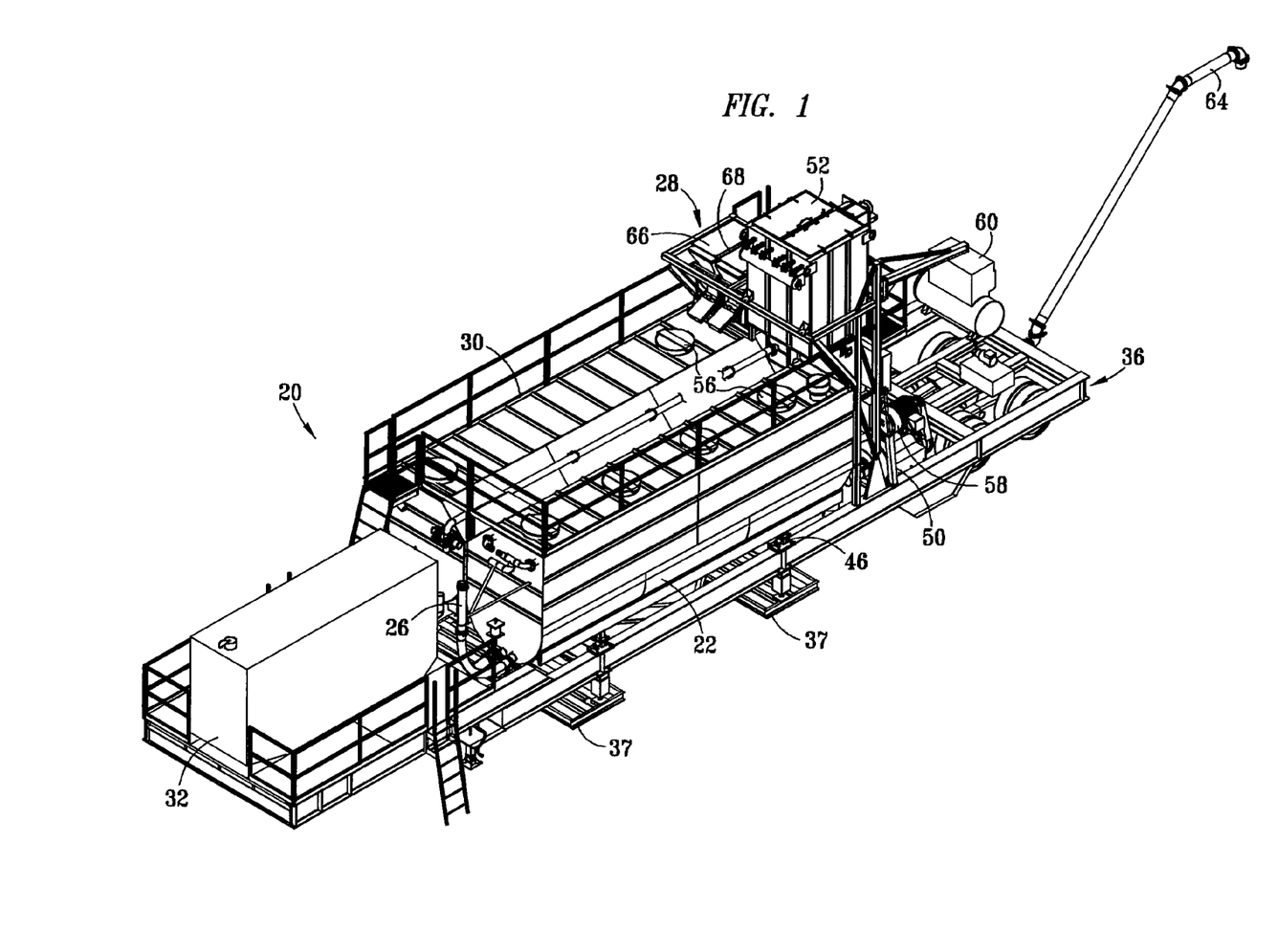
FIG. 1 is a front perspective view of a preferred trailer mounted mobile mixing apparatus that can be used to manufacture the novel slurry composition.
Figure 2:
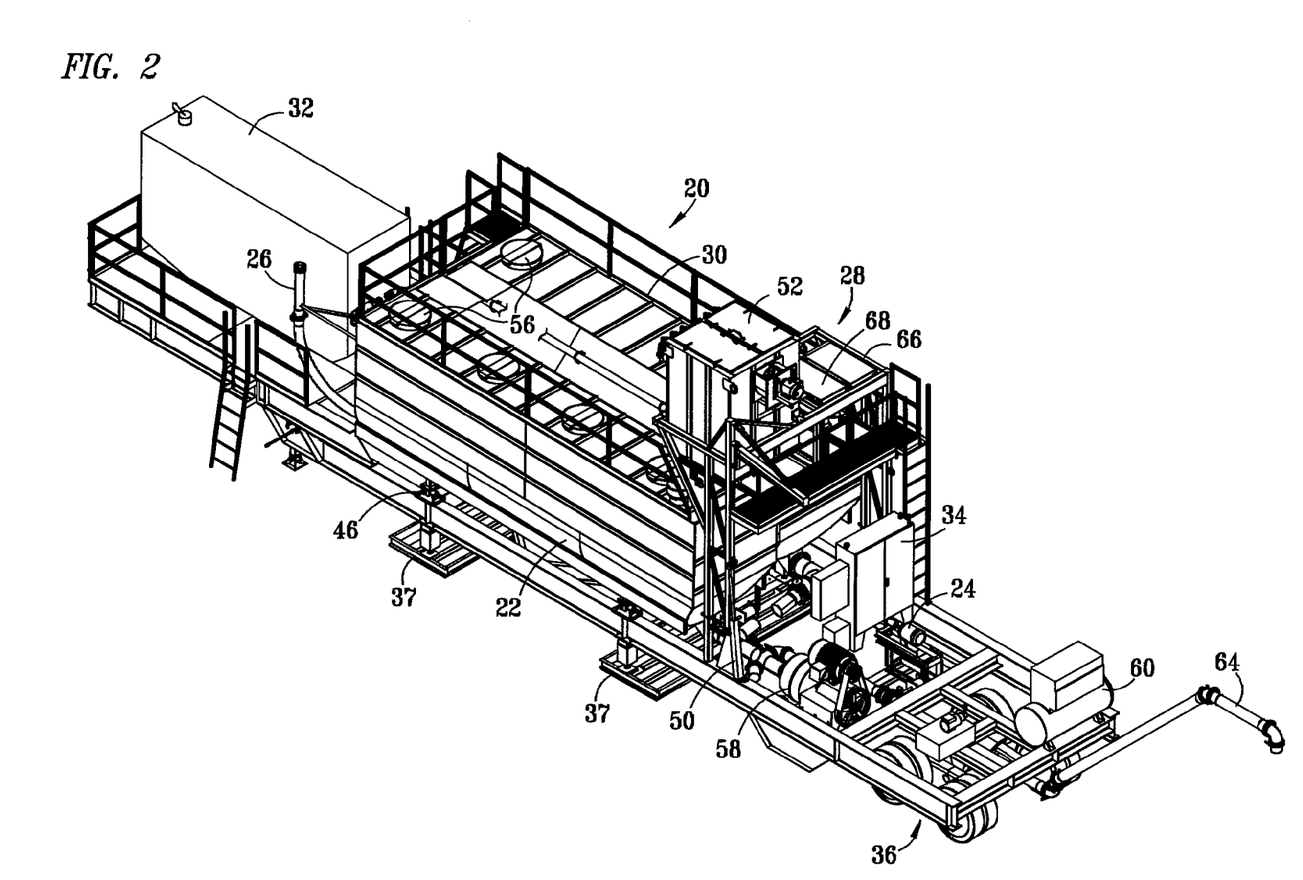
FIG. 2 is a rear perspective view of the apparatus of FIG. 1.
Figure 3:
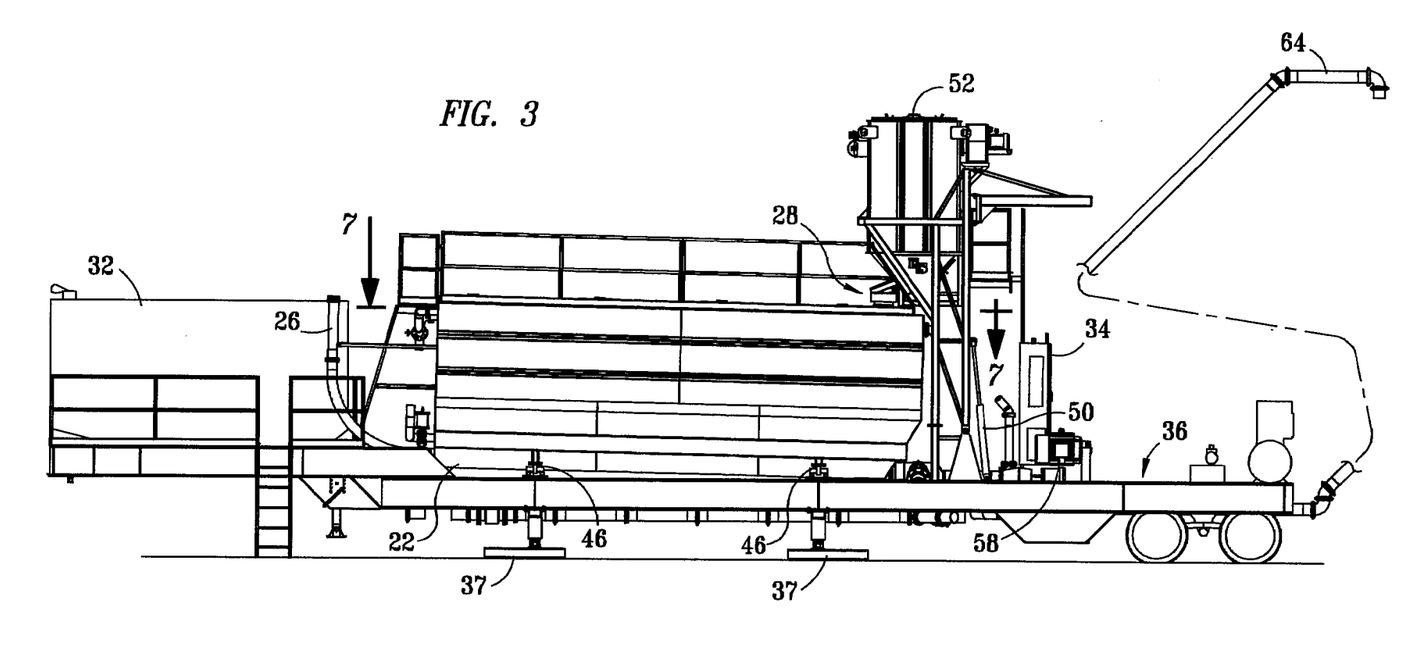
FIG. 3. is a side elevation view of the apparatus of FIG. 1.
Figure 4:
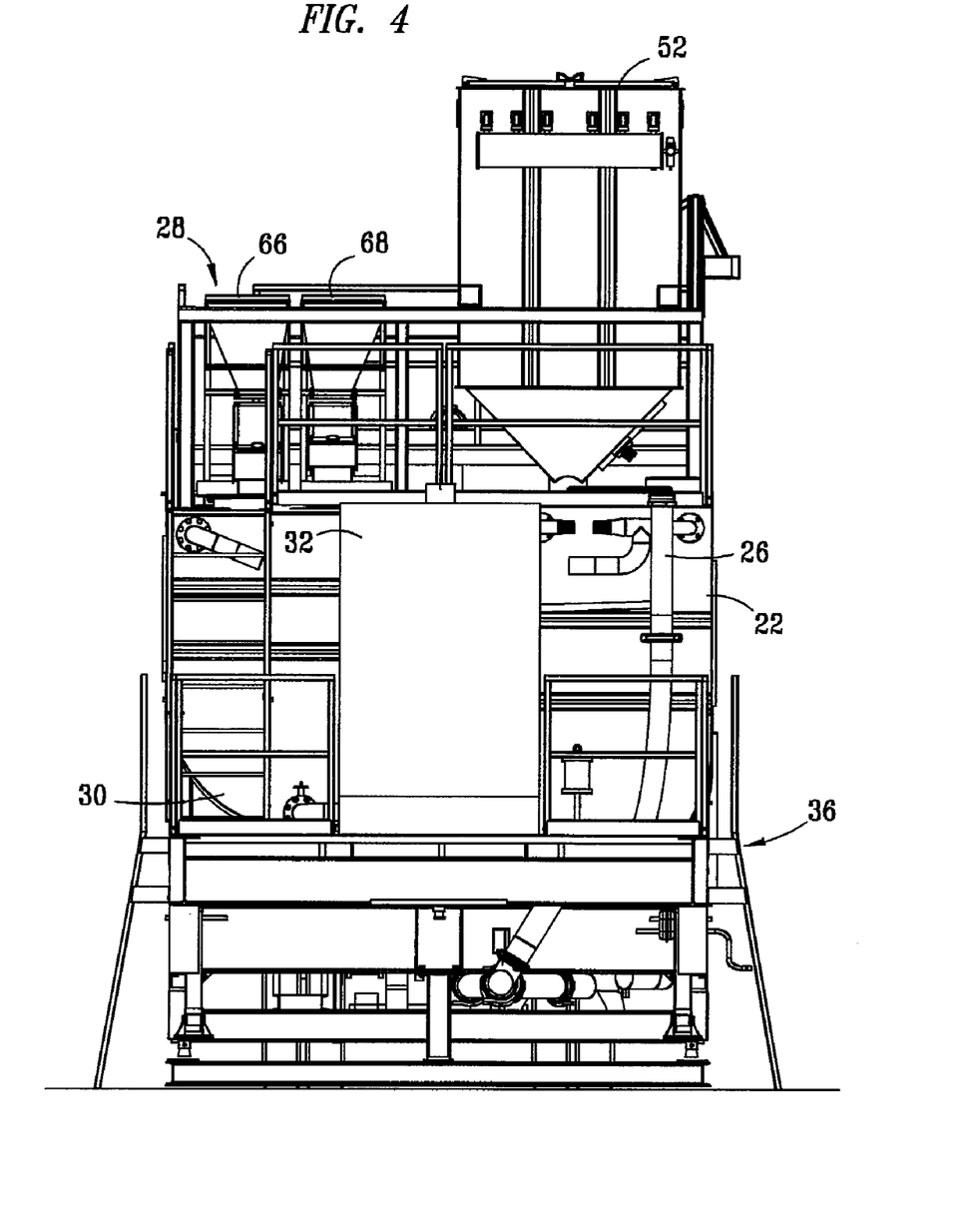
FIG. 4 is a front elevation view of the apparatus of FIG. 1.
Figure 5:
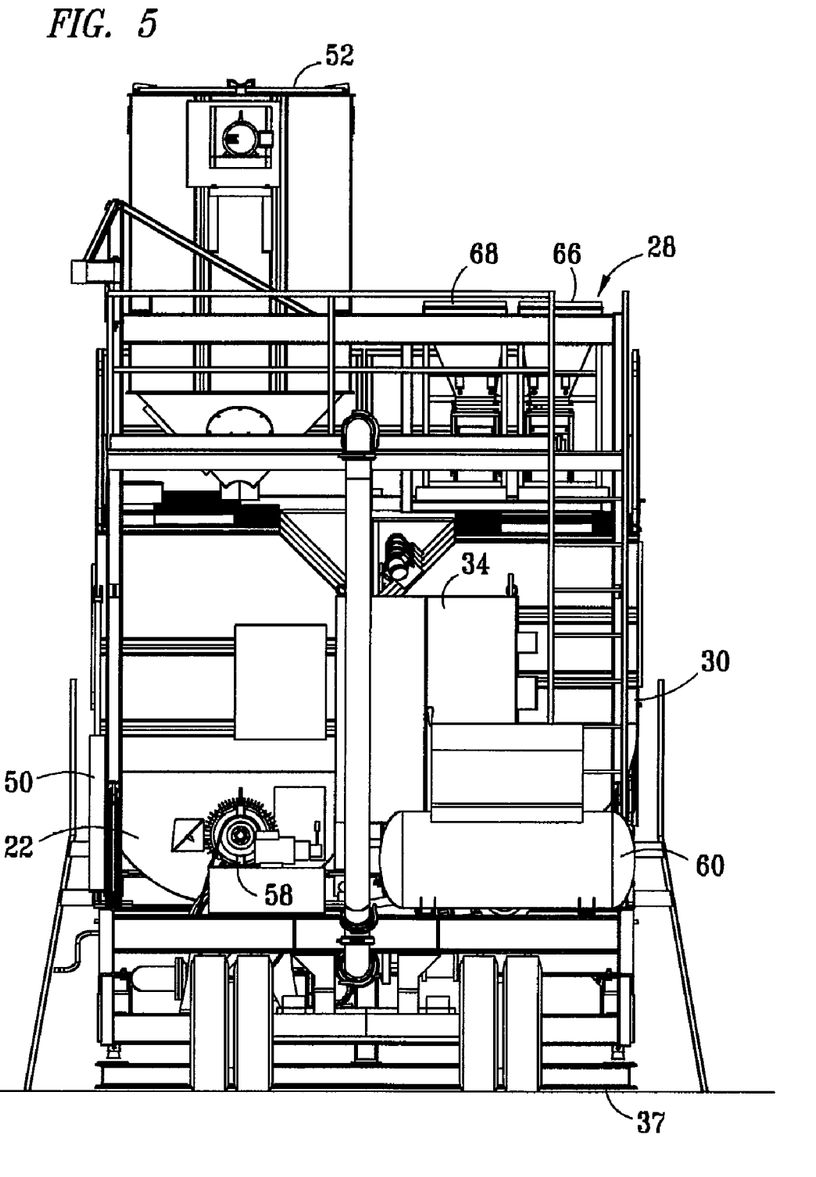
FIG. 5 is a rear elevation view of the apparatus of FIG. 1.
Figure 6:
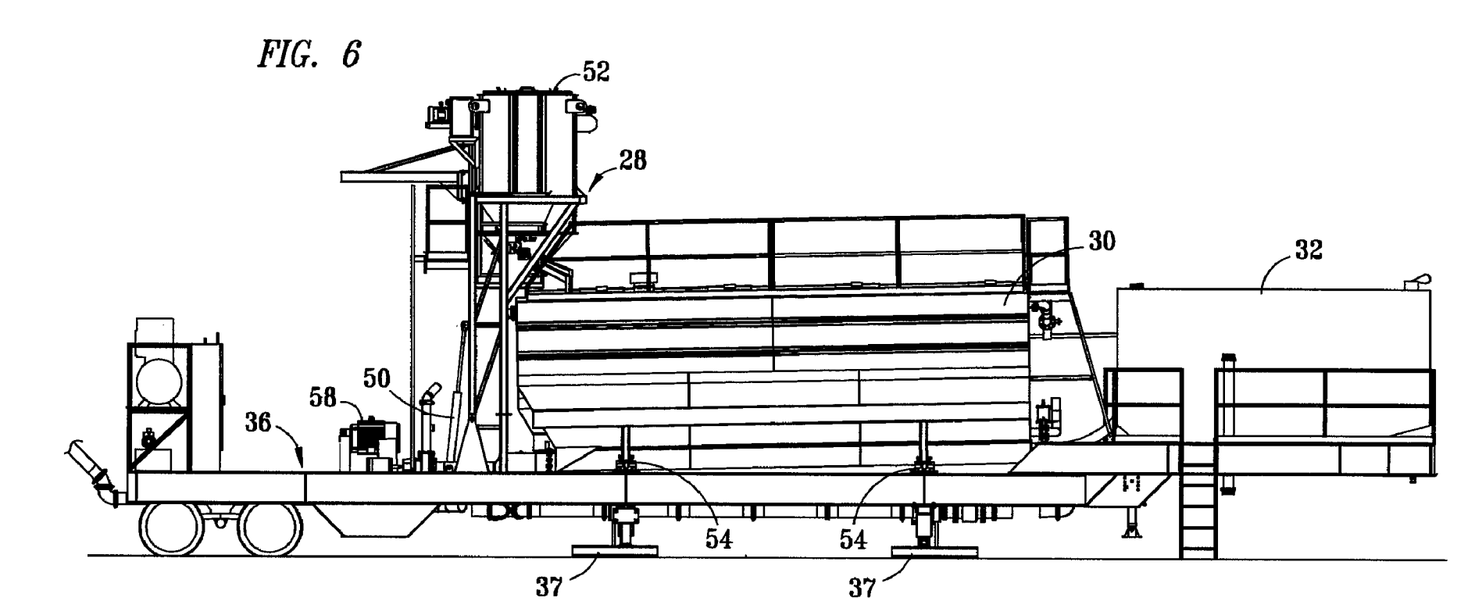
FIG. 6 is a back side elevation view of the apparatus of FIG. 1.
Figure 7:
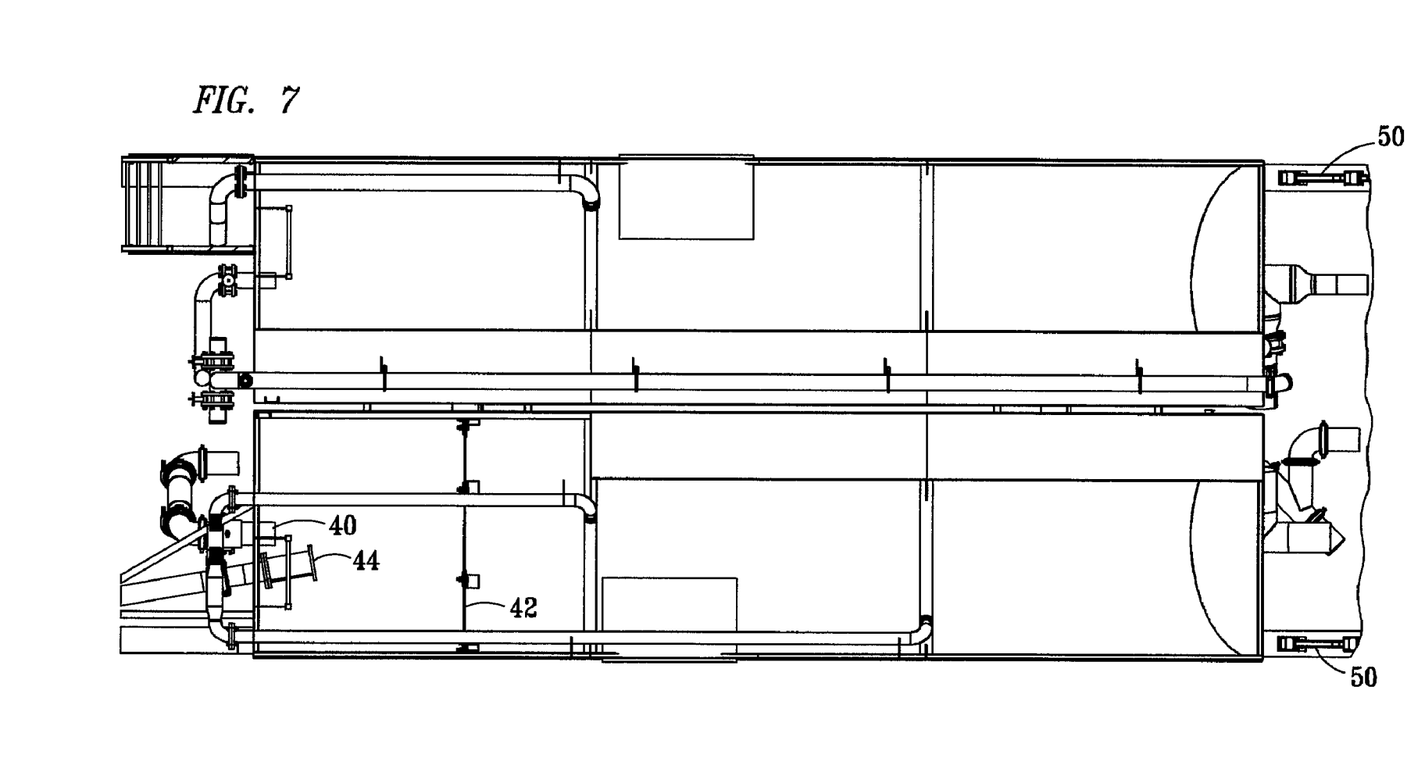
FIG. 7 is cross section view of the apparatus of FIG. 3, showing the internal structure of the various tanks.

As depicted in FIGS. 1-2 and 5, additive batcher 28 can be contain multiple compartments 66 and 68 such that additive batcher can be used to add the required amount of sugar or other retardant to the water in blending tank 30 in addition to the cellulosic. For example, compartment 56 could contain the cellulosic and compartment 58 could contain sugar. In this manner the required amount of the cellulosic and the retardant can be separately measured into blending tank 30. It is currently preferred that the defoamer is added directly to mixing tank 22 via gravity feed, but a third compartment in additive batcher 26 could alternatively be used to add defoamer. Defoamer can be added directly to mixing tank 22 by hand using one of the access ports 56 or by an automated system like the way additive batcher adds cellulosic and retardant to blending tank 30. Alternatively, the retardant can be gravity fed directly into mixing tank 22 just like the defoamer and additive batcher 28 can have only a single compartment. Load cells 54 are provided between blending tank 30 and trailer 36 and can be used to measure the amount of water, cellulosic and other additives that have been added to blending tank 30. Pump 24 can be used to recirculate the water and additives in blending tank 30 to provide a homogenous mixture prior to its addition to mixing tank 22.

Once the required amount of water is added to the mixing tank 22, the operator engages the recirculating pump 58 to begin recirculation of the water in mixing tank 22. Recirculating pump 58 removes fluid from mixing tank 22 at intake 38 and reintroduces it into mixing tank 22 through nozzle 40. Nozzle 40 is located below the water level in mixing tank 22 and directs the recirculating fluid at diffusion baffle 42. Preferably recirculating pump 58 is rated to circulate the fluid in mixing tank 22 at from about 1000 to about 1800 gallons per minute, most preferably 1800 gallons per minute, and reintroduce the fluid back into mixing tank 22 at a pressure of about from about 15 to about 45 pounds per square inch, most preferably at 30 psi.

While the water is being recirculated by recirculating pump 58, any defoamer that is required is gravity fed into mixing tank 22 through one of the access ports 56.

Either following or at the same time as the defoamer is being added, powdered cement is injected into cement injector line 26 and through nozzle 44 into mixing tank 22 below the waterline. Preferably cement is injected using a pressurized pneumatic injection pump that is located on the vehicle that transported the cement to the portable mixing station 20. Cement is preferably introduced into mixing tank 22 at a pressure of about 15 to about 45 pounds per square inch and a rate of about as low as 300 pounds per minute, although rates of 1500 to 2800 pounds per minute are preferred.

The amount of cement injected into the mixing tank 22 is determined by the batch size and the percentage of cement specified for the batch. As discussed above the preferred amount of cement in the cement slurry is from about 60 to about 65 by weight. Again load cells 46 can be used to determine when the appropriate amount of cement has been added to mixing tank 22. Cement injection nozzle 44 is located adjacent to recirculating nozzle 40. Like nozzle 40, nozzle 44 is located below the water line in mixing tank 22 and directs the injected cement at diffusion baffle 42. As nozzles 40 and 44 are located below the waterline in mixing tank 22 they preferably contain pinch valves or other suitable structure to prevent the slurry in mixing tank 22 from entering nozzles 40 and 44 when there is no recirculation or cement injection occurring. While cement is injected into mixing tank 22, recirculating pump 24 continues to recirculate the fluid in mixing tank 22, which contains an increasing amount of cement in addition to the water. When the proper amount of cement has been added to mixing tank 22, the cement injector pump is shut off and the cement injection ends. A pinch valve or a tide valve is preferably present in nozzle 40 to prevent the fluid from flowing back toward the cement injector pump 26.

Nozzles 40 and 44 are aimed such that the injected streams collide with each other at diffusion baffle 42. Diffusion baffle 42 detains, wets and breaks up the cement as it is added to the mix water as well as the cement that is being recirculated in the mix water. Diffusion baffle 42 preferably is a screen that has opening having a size in the range of about 1 to about 3 inches, most preferably about 2 inches. Larger openings in baffle 42 do not mix and break up the cement as effectively while smaller openings do not allow sufficient fluid to pass through and the pressure of the fluid and cement exiting nozzles 40 and 44 may dislodge or damages baffle 42. Similarly, baffle 42 is preferably located from about 2 to about 10 feet from nozzles 40 and 44. The force from the injection nozzle and outflow nozzle created from the high flow delivered by the mixing pump and the pressure from the pneumatic driven cement injection create a tremendous amount of mixing force directed against and through diffuser baffle 42. The flow of mixed/partially mixed slurry drives the dissolving cement to intake 38 of recirculating pump 58. The recirculating pump 24 intake of the cement slurry solution continues the mixing process within the pump drive chamber. The mechanical apparatus within recirculating pump 58 that drives and moves the slurry fluid acts as a mechanical mixer blending the slurry while helping to break up any small clumps that have been taken in to recirculating pump 58.

Following the addition of the cement to the mixing tank 22, any required admixtures are added to the cement slurry in mixing tank 22. During the addition of any admixtures, recirculation pump 58 contains to recirculate the cement slurry in mixing tank 22. As discussed above, the various admixtures including cellulosic and sugar or another retarding agent can be added to the slurry by premixing the additives to the portion of the water that was added to the blending tank 30 instead of mixing tank 22. Once the cement is completely wetted and adequately mixed with the water in mixing tank 22, the water containing the various admixtures in blending tank 30 can be added to mixing tank 22, using blending tank recirculation pump 24. The amount of all admixtures can vary depending on the need for slurry viscosity and set time. These are determined by quality control features and proximity to jobsite and logistics issues.

The admixtures added to the tank may include a retarding agent and/or a antifoaming/defoaming agent. As discussed above sugar is the preferred retarding agent and is added to mixing tank 22 in a proportion to the amount of cement that is being used in the particular batch. To the extent that the admixtures are not precombined in blending tank 30, they are preferably gravity fed into mixing tank 22. The amounts can be determined by scales and either added manually or by mechanical means to mixing tank 22.

Recirculation of the slurry fluid via recirculation pump 58 both during and after cement injection continues until a homogeneous cement slurry fluid is produced. Failure to achieve a homogenous cement slurry will result in an uneven batch of slurry where the cement can prematurely settle or set in part. However, recirculation of the slurry should be kept to the minimum required to generate a homogenous cement slurry because additional mixing will further degrade the cellulosic. It is determined that the cement slurry is homogeneous when the cement is fully suspended and there is no bleed water present.

The flow properties of the cement slurry provide indirect evidence of the complete suspension of the cement. When the slurry takes about 1 minute and 30 seconds to pass through an API flow cone, it is generally considered homogenous. If the flow rate is too high, the slurry is inefficiently viscous and will create problems when being discharged and applied to the soil. If the flow time is too low, the cement is not sufficiently suspended in the water. In general, this is achieved by running recirculation pump 58 for a period of about 2 to about 20 minutes following the addition of the additives and water from blending tank 30.

When the slurry is determined to be mixed properly and thoroughly transfer valve 48 is opened and the slurry is pumped using recirculating pump 58 through the slurry outlet pipe 64 into a waiting vehicle for transportation to and dispersion at the delivery site. Additional water can then be added to the mixing tank 22 to start a new batch of slurry. The control features can be either manual or automated to perform the necessary movements of valves or adjustments of amounts. Electronic controls 34 are provided to allow a single operator to control the operation of the various valves and pumps from a central location.

The novel slurry can be delivered to the site where it will be used in a modified tanker truck. A tanker truck can be modified to transport and deliver the cement slurry by including a spreader bar to disperse the slurry evenly over the soil to be stabilized. This is similar to the type of vehicle used to distribute lime products over the ground by various lime manufacturers. While no recirculation pump is required to transport the novel slurry, it has been found that the kinetic energy supplied to the cement slurry as a result of the slurry being transported to the site where it will be used helps to keep the cement in suspension during transport.

The novel cement slurry has numerous advantages over cement slurries that have been previously known. Amounts of cement up to about 65 weight percent can be suspended in water for just about as long as is desired. In fact, batches have been kept for over 10 hours without any evidence of settling and without the mixing or recirculating that is required when using conventional cement slurries. Further, the cement slurry does not prematurely set during transport or even once applied to the substrate soil but before being mechanically mixed into the soil. Even when placed on dry sand, moisture from the cement slurry does not evaporate or seep into the substrate soil to any noticeable extent until the slurry is mechanically mixed into the soil. Without being bound to any theory, it is currently believed that the methylcellulose effectively forms a polymer surface on the slurry that prevents the water from entering the soil or evaporating. The chopping action resulting from mechanically mixing the slurry into the substrate soil, breaks up this surface allowing the slurry to mix and react with the soil like ordinary cement. This aspect gives the operator a larger window after the cement slurry is laid down on the substrate soil before it must be mechanically mixed into the soil.

The use of the novel slurry also allows the operator to prevent the moisture level of the substrate that is to be stabilized from getting too high as was the case with prior cement slurries that contained lower proportions of cement. This is because the higher proportions of cement in the slurry mean that less water is added to the substrate in order to deliver the required amount of cement for the particular application. With less water being added as part of the slurry, the operator has more control over the moisture level of the substrate, which should be in a particular desired range in order to provide the best results.

The above description of certain embodiments are made for the purposes of illustration only and are not intended to be limiting in any manner. Other alterations and modifications of the preferred embodiment will become apparent to those of ordinary skill in the art upon reading the disclosure, and it is intended that the scope of the invention disclosed herein be limited only by the broadest interpretation of the appended claims to which the inventor is legally entitled.

What is claimed is:

1. A cement slurry comprising:
   from about 45 to about 65 weight percent cement;
   from about 55 to about 35 weight percent water;
   sucrose in an amount sufficient to prevent an increase of over 30 seconds for 32 ounces of slurry to pass through an API flow cone until the slurry is physically mixed into a substrate; and
   a thixotropic thickener in an amount such that 32 ounces of slurry pass through an API flow cone in from about 50 seconds to about 2 minutes;
   microstabilized pockets of air;
   wherein the slurry is adapted to be mixed into a substrate to form a stabilized substrate.

2. The cement slurry of claim 1 wherein the cement is selected from the group consisting of Portland cement, fly ash, slag cement, alkaline bypass dust, cement kiln dust, and combinations thereof.

3. The cement slurry of claim 1 comprising from about 60 to about 65 weight percent cement.

4. The cement slurry of claim 1 wherein the thixotropic thickener is selected from the group consisting of methylhydroxylethyl cellulose, cellulose ethers, and derivatives and combinations thereof.

5. The cement slurry of claim 1 further comprising a sufficient amount of defoamer to prevent excessive foaming.

6. The cement slurry of claim 5 wherein the amount of defoamer is from about 0.006 to about 0.02 weight percent by weight of cement.

7. The cement slurry of claim 1 wherein the slurry is physically mixed into the substrate after at least about eight hours.

8. The cement slurry of claim 1 wherein the amount of sucrose is from about 0.05 to about 0.1 weight percent by weight of cement.

9. A cement slurry comprising:
   from about 45 to about 65 weight percent cement;
   from about 55 to about 35 weight percent water;
   sucrose in an amount sufficient to prevent an increase of over 30 seconds for 32 ounces of slurry to pass through an API flow cone until the slurry is physically mixed into a substrate; and
   a cellulose-containing thixotropic thickener in an amount such that 32 ounces of slurry pass through an API flow cone in from about 50 seconds to about 2 minutes;
   microstabilized pockets of air;
   wherein the slurry is adapted to be mixed into a substrate to form a stabilized substrate.

10. The cement slurry of claim 9 wherein the cement is selected from the group consisting of Portland cement, fly ash, slag cement, alkaline bypass dust, cement kiln dust, and combinations thereof.

11. The cement slurry of claim 10 wherein the cement is Portland cement.

12. The cement slurry of claim 9 comprising from about 60 to about 65 weight percent cement.

13. The cement slurry of claim 9 wherein the cellulose-containing thixotropic thickener is selected from the group consisting of methylhydroxylethyl cellulose, cellulose ethers, and derivatives and combinations thereof.

14. The cement slurry of claim 13 wherein the cellulose-containing thixotropic thickener is methylhydroxyethyl cellulose.

15. The cement slurry of claim 9 wherein the cellulose-containing thixotropic thickener is from about 0.1 to about 3 weight percent by weight of the cement.

16. The cement slurry of claim 15 wherein the cellulose-containing thixotropic thickener is from about 0.1 to about 0.25 weight percent by weight of the cement.

17. The cement slurry of claim 9 wherein the cellulose-containing thixotropic thickener is from about 25,000 to about 45,000 PFV methylhydroxyethyl cellulose.

18. The cement slurry of claim 9 wherein the cement is about 60 weight percent and the cellulose-containing thixotropic thickener is from about 0.1 to about 0.2 weight percent by weight of cement.

19. The cement slurry of claim 9 further comprising a sufficient amount of defoamer to prevent excessive foaming.

20. The cement slurry of claim 19 wherein the amount of defoamer is from about 0.006 to about 0.02 weight percent by weight of cement.

21. The cement slurry of claim 9 wherein the slurry is physically mixed into the substrate after at least about eight hours.

22. The cement slurry of claim 9 wherein the amount of sucrose is from about 0.05 to about 0.1 weight percent by weight of cement.

23. The cement slurry of claim 22 wherein the amount of sucrose is about 0.05 weight percent by weight of cement.

24. The cement slurry of claim 10 wherein:
the cement is from about 60 to about 65 weight percent;
the water is from about 40 to about 35 weight percent;
the cellulose-containing thixotropic thickener is methylhydroxyethyl cellulose and is from about 0.1 to about 0.25 weight percent by weight of the cement; and
the sucrose is from about 0.05 to about 0.1 weight percent by weight of cement.

25. The cement slurry of claim 24 further comprising defoamer, wherein the defoamer is from about 0.006 to about 0.02 weight percent by weight of cement.

26. The cement slurry of claim 24 wherein:
the cement is about 60 weight percent;
the water is about 40 weight percent;
the methylhydroxyethyl cellulose is about 0.15 weight percent by weight of the cement; and
the sucrose is about 0.05 weight percent by weight of cement.

27. The cement slurry of claim 26 further comprising defoamer, wherein the defoamer is from about 0.006 to about 0.02 weight percent by weight of cement.

28. A method of forming a cement stabilized composition comprising the steps of:
providing a substrate;
adding to the substrate a cement slurry comprising from about 45 to about 65 weight percent cement, from about 40 to about 35 weight percent water, an amount of sucrose sufficient to prevent an increase of over 30 seconds for 32 ounces of slurry to pass through an API flow cone until the slurry is physically mixed into a substrate, and an amount of a cellulose-containing thixotropic thickener sufficient that 32 ounces of slurry pass through an API flow cone in from about 50 seconds to about 2 minutes;
mechanically mixing the cement slurry into the substrate; and
grading and compacting the soil and slurry mixture.

29. The method of claim 28 wherein the cement is selected from the group consisting of Portland cement, fly ash, slag cement, alkaline bypass dust, cement kiln dust, and combinations thereof.

30. The method of claim 29 wherein the cement is Portland cement.

31. The method of claim 28 wherein the substrate is selected from the group consisting of soil, aggregate, asphalt, reclaimed aggregate, reclaimed asphalt, and mixtures thereof.

32. The method of claim 28 wherein the cement slurry comprising from about 60 to about 65 weight percent cement.

33. The method of claim 28 wherein the cellulose-containing thixotropic thickener is selected from the group consisting of methylhydroxylethyl cellulose, cellulose ethers, and derivatives and combinations thereof.

34. The method of claim 33 wherein the cellulose-containing thixotropic thickener is methylhydroxyethyl cellulose.

35. The method of claim 28 wherein the cellulose-containing thixotropic thickener is from about 0.1 to 3 weight percent by weight of the cement.

36. The method of claim 35 wherein the cellulose-containing thixotropic thickener is from about 0.1 to about 0.25 weight percent by weight of the cement.

37. The method of claim 28 wherein the cellulose-containing thixotropic thickener is from about 25,000 to about 45,000 PFV methylhydroxyethyl cellulose.

38. The method of claim 28 wherein the cement is about 60 weight percent and the cellulose-containing thixotropic thickener is from about 0.1 to about 0.2 weight percent by weight of cement.

39. The method of claim 28 further comprising a sufficient amount of defoamer to prevent excessive foaming.

40. The method of claim 28 wherein the defoamer comprises from about 0.006 to about 0.02 weight percent by weight of cement.

41. The method of claim 28 wherein the slurry is physically mixed into the substrate after about eight hours.

42. The method of claim 28 wherein the amount of sucrose is from about 0.05 to about 0.1 weight percent by weight of cement.

43. The method of claim 42 wherein the amount of sucrose is about 0.05 weight percent by weight of cement.

44. The method of claim 29 wherein:
the cement is from about 60 to about 65 weight percent;
the water is from about 40 to about 35 weight percent;
the cellulose-containing thixotropic thickener is methylhydroxyethyl cellulose and is from about 0.1 to about 0.25 weight percent by weight of the cement;
the sucrose is from about 0.05 to about 0.1 weight percent by weight of cement; and
the substrate is selected from the group consisting of soil, aggregate, asphalt, reclaimed aggregate, reclaimed asphalt, and mixtures thereof.

45. The method of claim 44 further comprising defoamer, wherein the defoamer is from about 0.006 to about 0.02 weight percent by weight of cement.

46. The method of claim 44 wherein:
the cement is about 60 weight percent;
the water is about 40 weight percent;
the methylhydroxyethyl cellulose is about 0.15 weight percent by weight of the cement; and
the sucrose is about 0.05 weight percent by weight of cement.

47. The method of claim 46 wherein the cement slurry further comprises defoamer from about 0.006 to about 0.02 weight percent by weight of cement.

48. The method of claim 46 wherein the cement slurry has a flow time between 50 seconds and 2 minutes for 32 ounces of slurry through an API flow cone.

49. A method of making a cement slurry comprising the steps of:
Providing water in an amount from about 55 to about 35 weight percent of the total cement slurry;
adding cement to the water in an amount from about 45 to about 65 weight percent of the total cement slurry;
Adding sucrose in an amount sufficient to prevent an increase of over 30 seconds for 32 ounces of slurry to pass through an API flow cone until the slurry is physically mixed into a substrate,
Adding an amount of a cellulose-containing thixotropic thickener such that 32 ounces of slurry pass through an API flow cone in from about 50 seconds to about 2 minutes; and
statically mixing the cement slurry to form a thixotropic solution containing microstabilized pockets of air and where the slurry is adapted to be mixed into a substrate to form a stabilized base.

50. The method of claim 49 wherein the cement is selected from the group consisting of Portland cement, fly ash, slag cement, alkaline bypass dust, cement kiln dust, and combinations thereof.

51. The method of claim 50 wherein the cement is Portland cement.

52. The method of claim 49 wherein the cement slurry comprising from about 60 to about 65 weight percent cement.

53. The method of claim 49 wherein the cellulose-containing thixotropic thickener is selected from the group consisting of methylhydroxylethyl cellulose, cellulose ethers, and derivatives and combinations thereof.

54. The method of claim 53 wherein the cellulose-containing thixotropic thickener is methylhydroxyethyl cellulose.

55. The method of claim 49 wherein the cellulose-containing thixotropic thickener is from about 0.1 to about 3 weight percent by weight of the cement.

56. The method of claim 55 wherein the cellulose-containing thixotropic thickener is from about 0.1 to about 0.25 weight percent by weight of the cement.

57. The method of claim 49 wherein the cellulose-containing thixotropic thickener is from about 25,000 to about 45,000 PFV methylhydroxyethyl cellulose.

58. The method of claim 49 wherein the cement is about 60 weight percent and the cellulose-containing thixotropic thickener is from about 0.1 to about 0.2 weight percent by weight of cement.

59. The method of claim 49 further comprising a sufficient amount of defoamer to prevent excessive foaming.

60. The method of claim 59 wherein the defoamer comprises from about 0.006 to about 0.02 weight percent by weight of cement.

61. The method of claim 49 wherein the slurry is physically mixed into the substrate after about eight hours.

62. The method of claim 49 wherein the amount of sucrose is from about 0.05 to about 0.1 weight percent by weight of cement.

63. The method of claim 62 wherein the amount of sucrose is about 0.05 weight percent by weight of cement.

64. The method of claim 50 wherein:
the cement is from about 60 to about 65 weight percent;
the water is from about 40 to about 35 weight percent;
the cellulose-containing thixotropic thickener is methylhydroxyethyl cellulose and is from about 0.1 to about 0.25 weight percent by weight of the cement; and
the sucrose is from about 0.05 to about 0.1 weight percent by weight of cement.

65. The method of claim 64 further comprising defoamer, wherein the defoamer is from about 0.006 to about 0.02 weight percent by weight of cement.

66. The method of claim 64 wherein:
the cement is about 60 weight percent;
the water is about 40 weight percent;
the methylhydroxyethyl cellulose is about 0.15 weight percent by weight of the cement; and
the sucrose is about 0.05 weight percent by weight of cement.

67. The method of claim 66 wherein the cement slurry further comprises defoamer from about 0.006 to about 0.02 weight percent by weight of cement.

68. The method of claim 49 wherein:
a portion of the water is segregated into a major and minor portion prior to the addition of the cement;
the cellulose-containing thixotropic thickener and sucrose is added to the minor portion of water;
the cement is added to and mixed with the major portion of water; and
adding the minor portion of water into the major portion of water after the cement has been mixed with the major portion of water.

69. The method of claim 68 wherein the cement is selected from the group consisting of Portland cement, fly ash, slag cement, alkaline bypass dust, cement kiln dust, and combinations thereof.

70. The method of claim 69 wherein the cement is Portland cement.

71. The method of claim 68 wherein the cement slurry comprising from about 60 to about 65 weight percent cement.

72. The method of claim 68 wherein the cellulose-containing thixotropic thickener is selected from the group consisting of methylhydroxylethyl cellulose, cellulose ethers, and derivatives and combinations thereof.

73. The method of claim 72 wherein the cellulose-containing thixotropic thickener is methylhydroxyethyl cellulose.

74. The method of claim 68 wherein the cellulose-containing thixotropic thickener is from about 0.1 to 3 weight percent by weight of the cement.

75. The method of claim 74 wherein the cellulose-containing thixotropic thickener is from about 0.1 to about 0.25 weight percent by weight of the cement.

76. The method of claim 68 wherein the cellulose-containing thixotropic thickener is from about 25,00 to about 45,000 PFV methylhydroxyethyl cellulose.

77. The method of claim 68 wherein the cement is about 60 weight percent and the cellulosic is from about 0.1 to about 0.2 weight percent by weight of cement.

78. The method of claim 68 further comprising a sufficient amount of defoamer to prevent excessive foaming.

79. The method of claim 78 wherein the defoamer comprises from about 0.006 to about 0.02 weight percent by weight of cement.

80. The method of claim 78 wherein the slurry is physically mixed into the substrate after at least about eight hours.

81. The method of claim 78 wherein the amount of sucrose is from about 0.05 to about 0.1 weight percent by weight of cement.

82. The method of claim 81 wherein the amount of sucrose is about 0.05 weight percent by weight of cement.

83. The method of claim 69 wherein:
the cement is from about 60 to about 65 weight percent;
the water is from about 40 to about 35 weight percent;
the cellulose-containing thixotropic thickener is methylhydroxyethyl cellulose and is from about 0.1 to about 0.25 weight percent by weight of the cement; and
the sucrose is from about 0.05 to about 0.1 weight percent by weight of cement.

84. The method of claim 83 further comprising defoamer, wherein the defoamer is from about 0.006 to about 0.02 weight percent by weight of cement.

85. The method of claim 83 wherein:
the cement is about 60 weight percent;
the water is about 40 weight percent;
the methylhydroxyethyl cellulose is about 0.15 weight percent by weight of the cement; and
the sucrose is about 0.05 weight percent by weight of cement.

86. The method of claim 85 wherein the cement slurry further comprises defoamer from about 0.006 to about 0.02 weight percent by weight of cement.

* * * * *